(12) United States Patent
Snyder et al.

(10) Patent No.: US 10,540,256 B1
(45) Date of Patent: *Jan. 21, 2020

(54) AUTOMATIC REVIEW OF SQL STATEMENT COMPLEXITY

(71) Applicant: State Farm Mutual Automobile Insurance Company, Bloomington, IL (US)

(72) Inventors: Richard Snyder, Colfax, IL (US); Matthew R Anderson, Bloomington, IL (US); Daniel Galvin, Bloomington, IL (US)

(73) Assignee: State Farm Mutual Automobile Insurance Company

(*) Notice: Subject to any disclaimer, the term of this patent is extended or adjusted under 35 U.S.C. 154(b) by 0 days.

This patent is subject to a terminal disclaimer.

(21) Appl. No.: 16/178,829

(22) Filed: Nov. 2, 2018

Related U.S. Application Data

(63) Continuation of application No. 15/410,156, filed on Jan. 19, 2017, now Pat. No. 10,162,729.

(60) Provisional application No. 62/289,423, filed on Feb. 1, 2016.

(51) Int. Cl.
    *G06F 9/44*      (2018.01)
    *G06F 11/36*     (2006.01)
    *G06F 17/27*     (2006.01)
    *G06F 16/2453*   (2019.01)
    *G06F 16/2455*   (2019.01)

(52) U.S. Cl.
    CPC .... *G06F 11/3616* (2013.01); *G06F 16/24534* (2019.01); *G06F 16/24564* (2019.01); *G06F 17/2705* (2013.01)

(58) Field of Classification Search
    CPC .................................. G06F 17/30386–30696
    USPC ......................................................... 717/110
    See application file for complete search history.

(56) References Cited

U.S. PATENT DOCUMENTS

| | | |
|---|---|---|
| 5,875,334 A | 2/1999 | Chow |
| 6,052,681 A | 4/2000 | Harvey |
| 6,772,411 B2 | 8/2004 | Hayes |
| 7,234,112 B1 | 6/2007 | Brown |
| 7,430,549 B2 | 9/2008 | Zane |
| 7,433,863 B2 | 10/2008 | Zane |
| 7,590,620 B1 | 9/2009 | Pike |
| 8,214,356 B1 | 7/2012 | Annapragada |

(Continued)

OTHER PUBLICATIONS

"Journal of the Association for Information Systems: The Effects of Information Request Language and Template Usage on Query Formulation"; Leo Vijayasarathy and Gretchen Irwin Casterella—Computer Information Systems, College of Business, Colorado State University; Aug. 11, 2014.*

*Primary Examiner* — Francisco J Aponte

(57) ABSTRACT

A computer-implemented method for automatically reviewing structured query language (SQL) statements comprises the steps of receiving SQL code from a user seeking to access a database, parsing the SQL code to retrieve SQL keywords, mathematical operators, and logical operators, applying a complexity score calculation algorithm to the parsed code, calculating a complexity score, and executing the SQL code on a computing system which stores the database if the complexity score is less than or equal to a threshold. On the other hand, if the complexity score is greater than the threshold, the SQL code may be flagged to be rewritten.

20 Claims, 6 Drawing Sheets

(56) References Cited

U.S. PATENT DOCUMENTS

| | | | |
|---|---|---|---|
| 8,489,580 B2 * | 7/2013 | Kulkarni | G06F 16/2453 |
| | | | 707/713 |
| 8,793,248 B2 | 7/2014 | Friedmann | |
| 8,805,818 B2 | 8/2014 | Zane | |
| 8,924,314 B2 | 12/2014 | Kulkarni | |
| 8,976,197 B1 | 3/2015 | Leber | |
| 9,152,717 B2 | 10/2015 | Bao | |
| 9,189,519 B2 | 11/2015 | Becerra | |
| 9,298,853 B2 | 3/2016 | Chi | |
| 9,391,902 B2 | 7/2016 | Eliáš | |
| 9,563,866 B2 | 2/2017 | Mehta | |
| 9,613,083 B2 | 4/2017 | Simitsis | |
| 9,881,088 B1 | 1/2018 | Leber | |
| 2003/0158842 A1 | 8/2003 | Levy | |
| 2005/0065969 A1 | 3/2005 | Thomas | |
| 2005/0125280 A1 | 6/2005 | Carr | |
| 2005/0125401 A1 | 6/2005 | Carr | |
| 2006/0200450 A1 | 9/2006 | Keane | |
| 2009/0083219 A1 | 3/2009 | Zane | |
| 2009/0197232 A1 | 8/2009 | Couch | |
| 2010/0191720 A1 | 7/2010 | Al-Omari | |
| 2010/0198816 A1 | 8/2010 | Kwan | |
| 2011/0010379 A1 * | 1/2011 | Gilderman | G06F 16/252 |
| | | | 707/759 |
| 2011/0313999 A1 * | 12/2011 | Bruno | G06F 16/24537 |
| | | | 707/718 |
| 2012/0246170 A1 | 9/2012 | Iantorno | |
| 2012/0271815 A1 * | 10/2012 | Pennell, Sr. | G06F 16/24542 |
| | | | 707/718 |
| 2012/0323885 A1 * | 12/2012 | Wang | G06F 16/2456 |
| | | | 707/714 |
| 2013/0097664 A1 | 4/2013 | Herz | |
| 2014/0101135 A1 * | 4/2014 | Yousaf | G06F 16/24534 |
| | | | 707/722 |
| 2014/0105509 A1 | 4/2014 | Dusberger | |
| 2014/0129588 A1 | 5/2014 | Chi | |
| 2015/0088913 A1 | 3/2015 | Feng | |
| 2015/0169685 A1 | 6/2015 | Elias | |
| 2016/0055206 A1 | 2/2016 | Becerra | |

* cited by examiner

AUTOMATIC REVIEW OF SQL STATEMENT COMPLEXITY

RELATED APPLICATION

The current non-provisional patent application is a continuation of, and claims the benefit of, U.S. patent application Ser. No. 15/410,156, entitled "Automatic Review of SQL Statement Complexity" and filed Jan. 19, 2017, which claims priority benefit, with regard to all common subject matter, of U.S. Provisional Application No. 62/289,423, titled "AUTOMATIC REVIEW OF SQL STATEMENTS", and filed Feb. 1, 2016. The listed, earlier-filed applications are hereby incorporated by reference in their entireties into the current application.

FIELD OF THE INVENTION

The present disclosure generally relates to methods, devices, and computer-readable media for automatically reviewing structured query language (SQL) statements.

BACKGROUND

Structured query language (SQL) is a standard computer-based language for accessing a database. Among other functions, SQL may be utilized to insert, query, update, and delete data in a database, create and modify database schema, and control access to the database. Large corporations, such as insurance providers, may maintain a plurality of databases, some of which may store a vast amount of data. Various departments, including accounting, sales, marketing, etc., within the corporation may desire access to the databases in order to provide or retrieve data regarding customers, products, and so forth. Coders, developers, or programmers may write code in SQL to access a database for their particular purpose. However, the coders might not be aware of the amount of resources that their code requires of the database computing system and the computing staff who support the computing system. Computing run time, storage space, and the ability to correct or modify the code in case of an error are all complexity factors that should be considered before allowing SQL code to execute on the database computing system. Furthermore, some coders who are proficient in writing SQL code might not realize that some of the functions they are trying to perform with SQL may be better performed using other programming languages, such as Java, PL1, COBOL, or the like, which do not possess the complexity of SQL code.

BRIEF SUMMARY

Embodiments of the present technology relate to computer-implemented methods, computing devices, and computer-readable media for automatically reviewing structured query language (SQL) statements. The embodiments provide for receiving SQL that seeks to access or modify a database. The code is parsed to retrieve SQL keywords, mathematical operators, and logical operators. A complexity score calculation algorithm is applied to the parsed code. The complexity score is calculated and the SQL code is executed on a computing system which stores the database if the complexity score is less than or equal to a first threshold.

In a first aspect, a computer-implemented method for automatically reviewing structured query language (SQL) statements may be provided. The method may include: (1) receiving SQL code from a user seeking to access a database; (2) parsing the SQL code to retrieve SQL keywords, mathematical operators, and logical operators; (3) applying a complexity score calculation algorithm to the parsed code; (4) calculating a complexity score; and/or (5) executing the SQL code on a computing system which stores the database if the complexity score is less than or equal to a first threshold. The method may include additional, fewer, or alternative actions, including those discussed elsewhere herein.

In another aspect, a computer-readable medium for automatically reviewing structured query language (SQL) statements may be provided. The computer-readable medium may include an executable program stored thereon, wherein the program instructs a processing element of a computing device to perform the following steps: (1) receiving SQL code from a user seeking to access a database; (2) parsing the SQL code to retrieve SQL keywords, mathematical operators, and logical operators; (3) applying a complexity score calculation algorithm to the parsed code; (4) calculating a complexity score; and/or (5) executing the SQL code on a computing system which stores the database if the complexity score is less than or equal to a first threshold. The program stored on the computer-readable medium may instruct the processing element to perform additional, fewer, or alternative actions, including those discussed elsewhere herein.

In yet another aspect, a computing device for automatically reviewing structured query language (SQL) statements may be provided. The computing device may include a communication element, a memory element, and a processing element. The communication element may receive and transmit communications to and from a communication network. The memory element may be electronically coupled to the communication element and may store executable instructions. The processing element may be electronically coupled to the communication element and the memory element. The processing element may be configured to receive SQL code from a user seeking to access a database; parse the SQL code to retrieve SQL keywords, mathematical operators, and logical operators; apply a complexity score calculation algorithm to the parsed code; calculate a complexity score; and/or execute the SQL code on a computing system which stores the database if the complexity score is less than or equal to a first threshold. The computing device may include additional, fewer, or alternate components and/or functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of methods and devices disclosed therein. It should be understood that each Figure depicts an embodiment of a particular aspect of the disclosed methods and devices, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
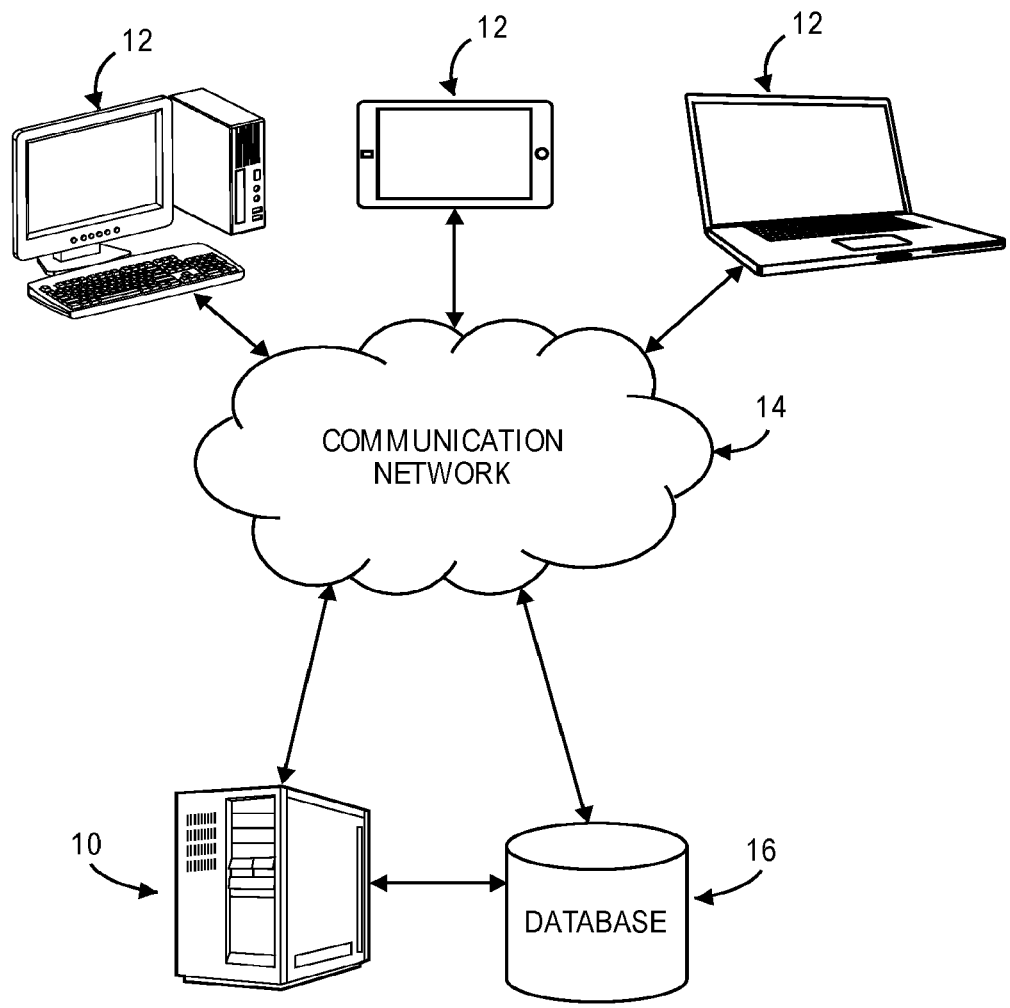
FIG. 1 illustrates an exemplary environment in which various embodiments of a computing device, configured to automatically review structured query language (SQL) statements, may operate, the exemplary environment including a communication network that allows communication between various electronic devices, at least one database, and the computing device.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments address a computer-centric challenge or problem with a solution that is necessarily rooted in computer technology and may relate to, inter alia, devices and methods for automatically reviewing structured query language (SQL) statements. SQL is a computer-based language for accessing a database. Coders, developers, or programmers may write SQL code to perform one or more tasks involving the database. The code may include a plurality of statements that follow SQL syntax and thus may include known keywords and operators. The code is received by the present embodiments which parse the code and create a list of keywords and operators that are present in the code. The embodiments calculate a score which varies according to the presence of keywords and operators in the list, wherein certain keywords and operators are weighted more heavily according to the complexity they create. The score is then compared to a first threshold value. If the score is less than or equal to the first threshold, then the code is allowed to be deployed on a computing system that stores the database. If the score is slightly greater than the first threshold, then the code may be flagged, such as by sending an alert to computing system administrators to review the code. In various embodiments, the code may be allowed to deploy on the computing system anyway. If the score is greater than a second threshold (e.g., five or ten times greater than the first threshold), then the code may be flagged and may be transferred back to the original coders to be rewritten.

The current embodiments do not simply use a computer to automate what was done previously, but rather improve upon what was previously done with computers, solving a computer problem. Specifically, the claimed embodiments expand the functionality of existing computer software, local or on a computer network, by addressing a problem specific to the realm of computers—that is, to automatically determine whether the complexity level of SQL code is great enough to cause issues when it is executed on a computing system. Without computers, the problem and the solution provided by this invention would not exist.

Specific embodiments of the technology will now be described in connection with the attached drawing Figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary Computing Device

FIG. 1 depicts an exemplary environment in which embodiments of a computing device 10 may be utilized for automatically reviewing structured query language (SQL) statements. The environment may include one or more electronic devices 12, a communication network 14, and one or more databases 16. The electronic device 12 may be embodied by workstation computers, desktop computers, laptop computers, palmtop computers, notebook computers, tablets or tablet computers, smartphones, personal digital assistants (PDAs), other mobile devices, or the like. A user, such as a coder, developer, or programmer, may utilize an electronic device 12 to create SQL code, which includes one or more statements that access and/or operate on the database 16. Thus, the electronic device 12 may include text editing or word processing software which allows the user to create the code. In certain embodiments, the electronic device 12 may include SQL development software. After the user creates the SQL code, he may transmit the code from his electronic device 12 through the communication network 14 to the computing device 10.

The communication network 14 generally allows communication between the electronic devices 12 and the computing device 10, such as via wireless communication and data transmission over one or more radio links. The communication network 14 may include local area networks, metro area networks, wide area networks, cloud networks, the Internet, cellular networks, plain old telephone service (POTS) networks, and the like, or combinations thereof. The communication network 14 may be wired, wireless, or combinations thereof and may include components such as modems, gateways, switches, routers, hubs, access points, repeaters, towers, and the like. The electronic devices 12 may connect to the communication network 14 either through wires, such as electrical cables or fiber optic cables, or wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth™, or combinations thereof.

The database 16 may be embodied by any organized collection of data and may include schemas, tables, queries, reports, and so forth which may be implemented as data types such as bibliographic, full-text, numeric, images, or the like and combinations thereof. The database 16 may be stored in memory that resides in one computing machine, such as a server, or multiple computing machines. In some embodiments, the database 16 may reside in the same machine as one of the electronic devices 12 or the computing device 10. In addition, the database 16 may interface with, and be accessed through, a database management system, as is commonly known. The computing device 10 may communicate with the database through the communication network 14 or directly.

Figure 2:
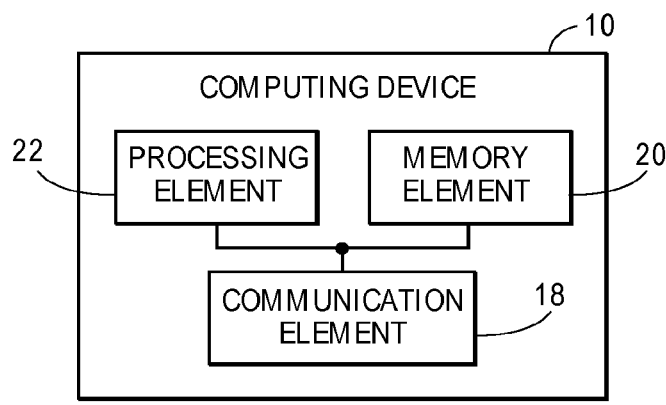
FIG. 2 illustrates various components of the exemplary computing device shown in block schematic form.
Figure 3A:
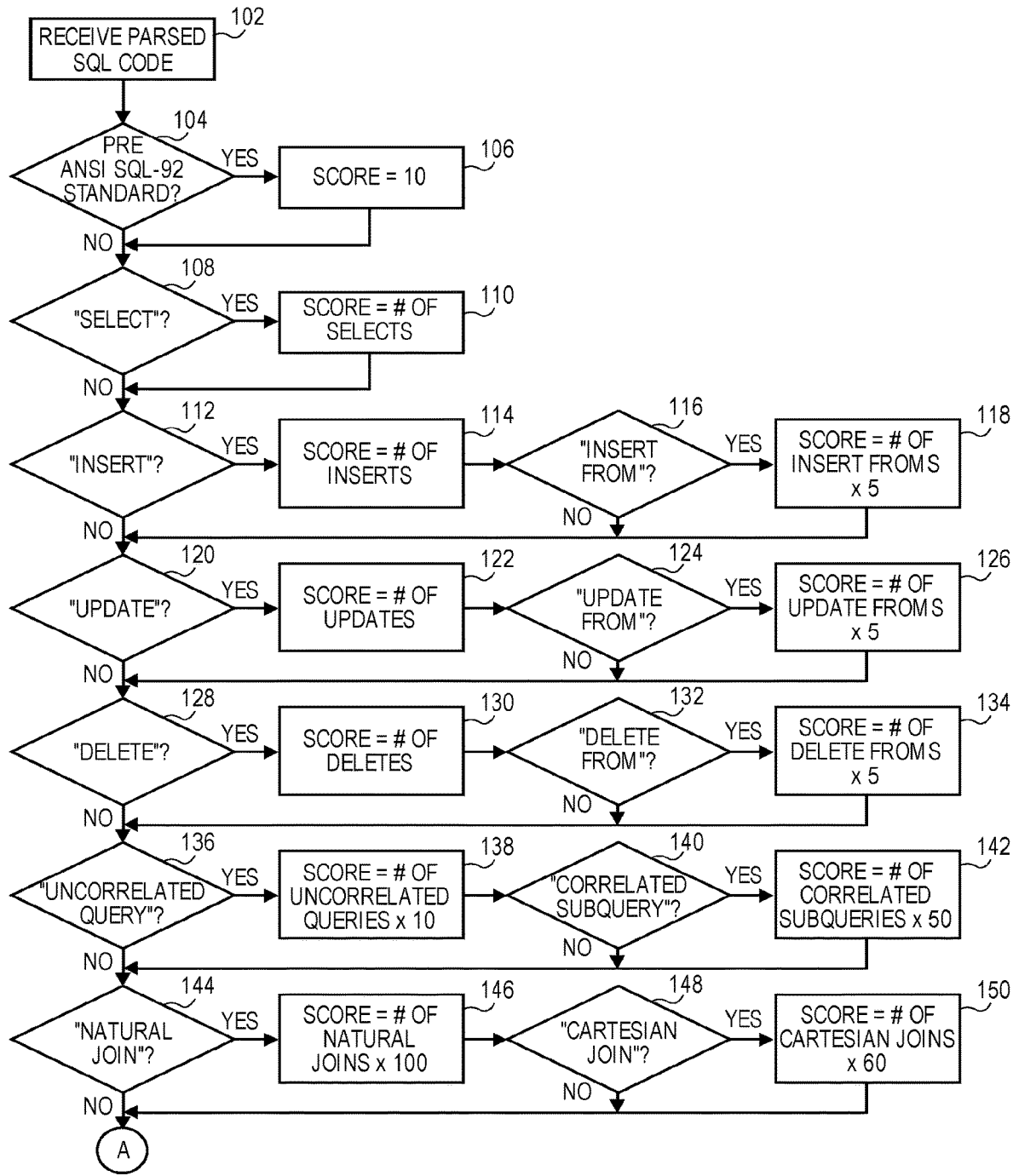
FIGS. 3A-3D illustrates a flow diagram of at least a portion of the exemplary flow of a complexity score calculation algorithm.
Figure 3B:
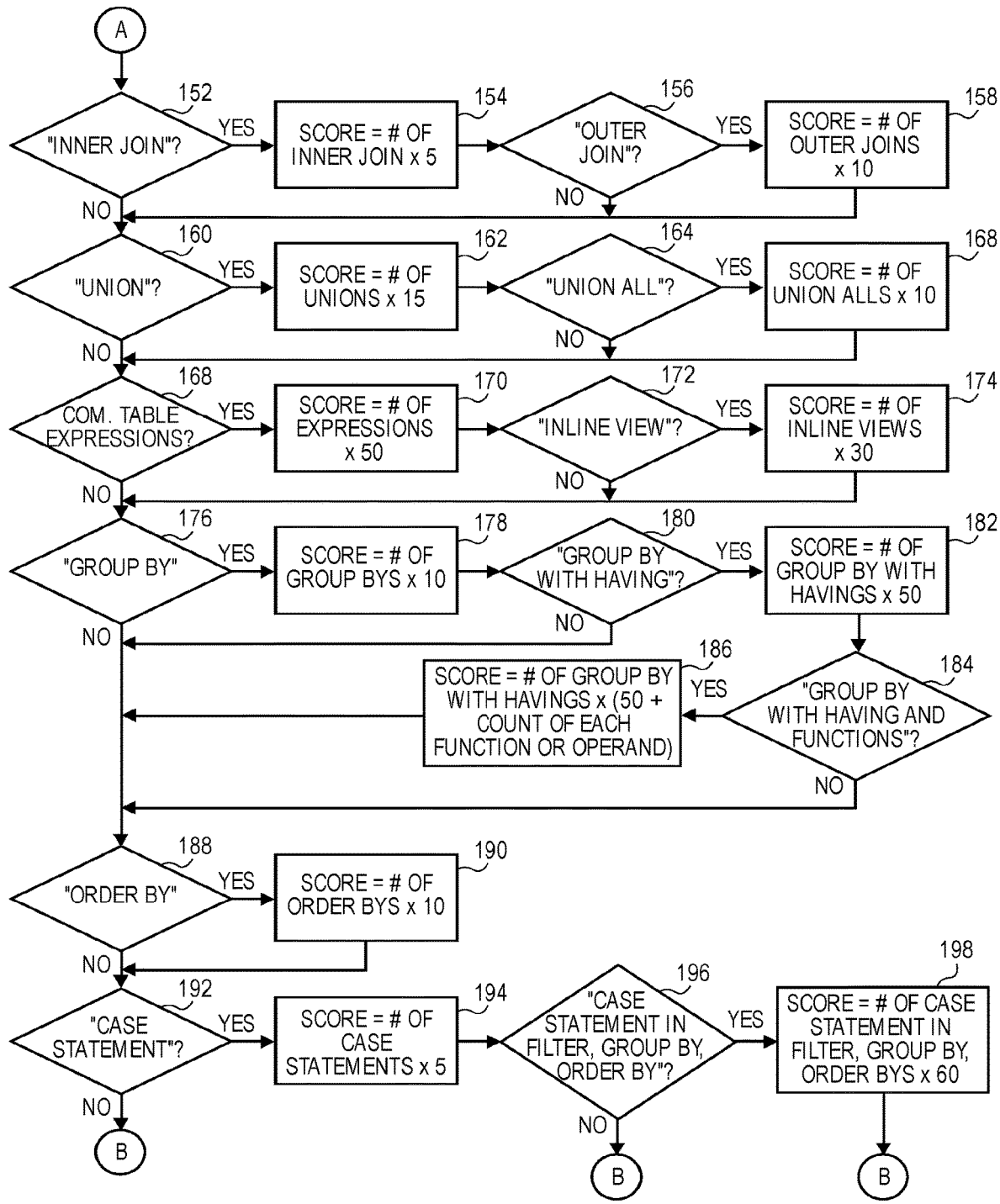
Figure 3C:
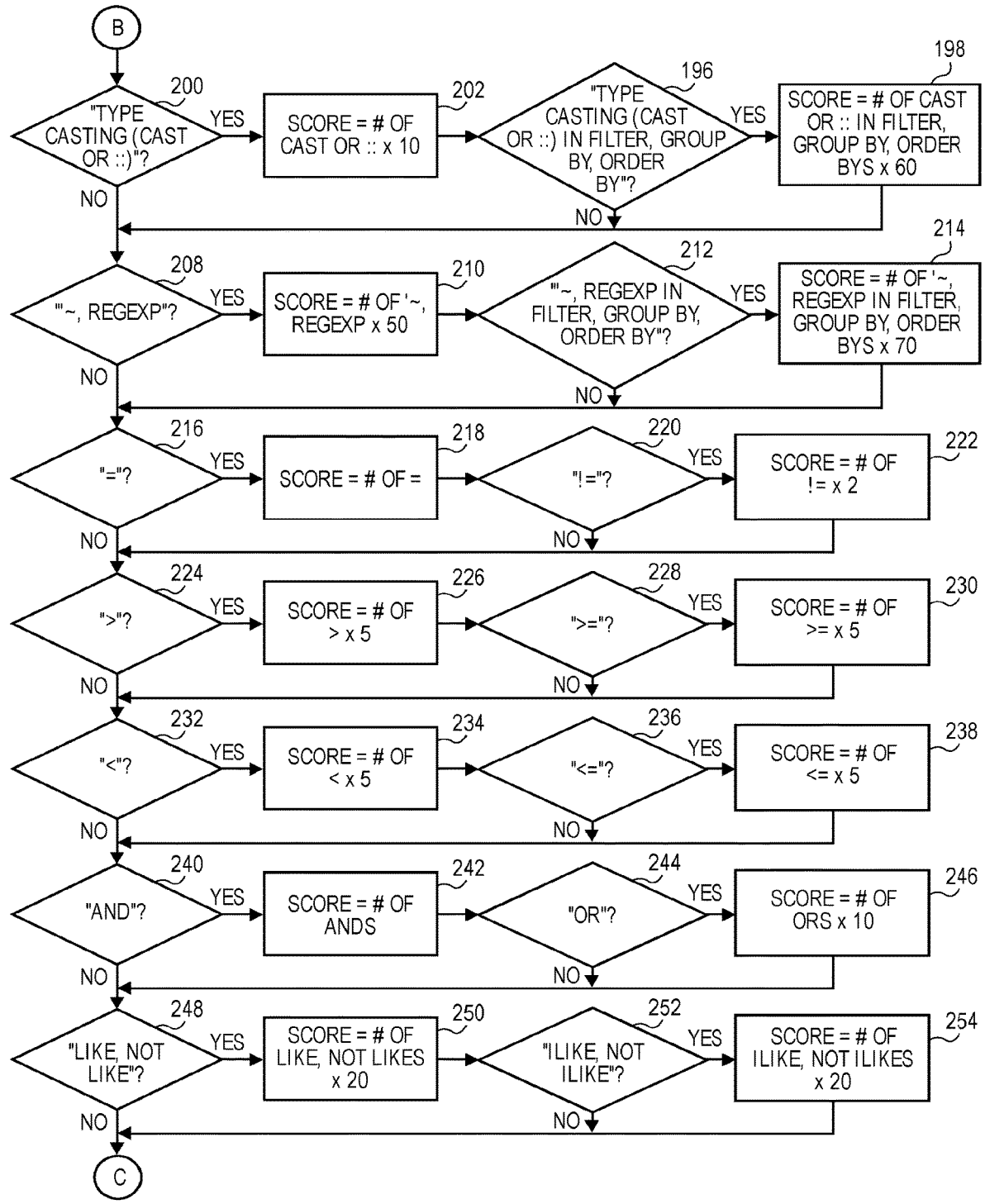
Figure 3D:
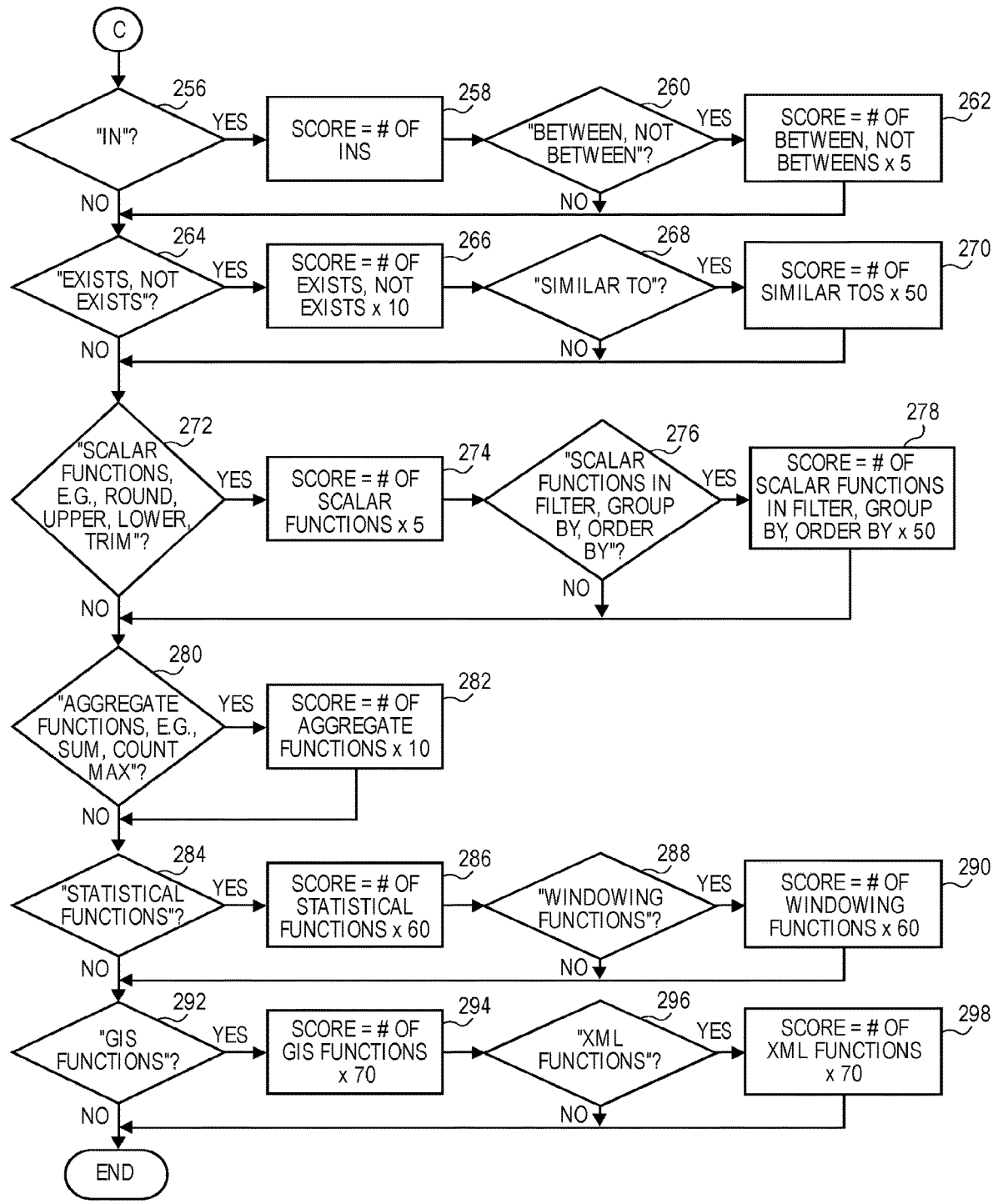

The computing device 10 may be embodied by workstation computers, desktop computers, laptop computers, palmtop computers, notebook computers, tablets or tablet computers, application servers, database servers, file servers, web servers, or the like, or combinations thereof. The computing device 10, as shown in FIG. 2, may broadly comprise a communication element 18, a memory element 20, and a processing element 22.

The communication element 18 generally allows the computing device 10 to receive data from the communication network 14. The communication element 18 may include signal or data transmitting and receiving circuits, such as antennas, amplifiers, filters, mixers, oscillators, digital signal processors (DSPs), and the like. The communication element 18 may establish communication wirelessly by utilizing RF signals and/or data that comply with communication standards such as cellular 2G, 3G, or 4G. IEEE 802.11 standard such as WiFi, IEEE 802.16 standard such as WiMAX, Bluetooth™, or combinations thereof. In addition, the communication element 18 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 18 may establish communication through connectors or couplers that receive metal conductor wires or cables which are compatible with networking technologies such as Ethernet. In certain embodiments, the communication element 18 may also couple with optical fiber cables. The communication element 18 may be in communication with the processing element 22 and the memory element 20.

The memory element 20 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 20 may be embedded in, or packaged in the same package as, the processing element 22. The memory element 20 may include, or may constitute, a "computer-readable medium." The memory element 20 may store the instructions, code, code segments, software, firmware, programs, applications, apps, services, daemons, or the like that are executed by the processing element 22. The memory element 20 may also store settings, data, documents, sound files, photographs, movies, images, databases, and the like.

The processing element 22 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 22 may generally execute, process, or run instructions, code, code segments, software, firmware, programs, applications, apps, processes, services, daemons, or the like. The processing element 22 may also include hardware components such as finite-state machines, sequential and combinational logic, and other electronic circuits that can perform the functions necessary for the operation of the current invention. The processing element 22 may be in communication with the other electronic components through serial or parallel links that include address busses, data busses, control lines, and the like.

The processing element 22 may be configured or programmed to perform the following functions through hardware, software, firmware, or combinations thereof. In various embodiments, the processing element 22 may execute a software application which includes code that instructs the processing element 22 to perform the steps, functions, and operations discussed below. The processing element 22 may receive SQL code, through the communication element 18, from a coder, developer, or programmer. SQL is generally used to access or modify the database 16 and may be formed from clauses, expressions, predicates, queries, and statements. SQL code may also include keywords, mathematical operators, and logical operators. The processing element 22 may parse the code and retrieve SQL keywords, mathematical operators, and logical operators. Examples of SQL keywords include, but are not limited to, "select", "insert", "update", and the like. Mathematical operators may include, but are not limited to, "=", "<", ">", and the like. Logical operators may include, but are not limited to, "AND", "OR", "NOT", and the like. The result of parsing may be a list, table, or array of the keywords and operators which were included in the originally submitted SQL code.

The processing element 22 may apply a complexity score calculation algorithm to the parsed code. An exemplary complexity score calculation algorithm 100 is shown in FIGS. 3A-3D. The algorithm 100 may begin with receiving the parsed SQL code in step 102. The algorithm 100 may then check in step 104 if the parsed SQL code was derived from SQL code that was written using older, pre ANSI SQL-92 standard statements. (SQL-92 was a major revision to the SQL language standard which introduced numerous new features.) The processing element 22 may detect metadata or header statements in the parsed SQL code which identify the version of SQL that was used to create the code. Or, the processing element 22 may detect the lack of newer SQL statement syntax and conclude that the code is pre SQL-92. If pre SQL-92 is detected, then a temporary score is set to a value of 10 in step 106. The rest of the steps 108-298 of the algorithm 100 may determine the presence of keywords and operators in the parsed SQL code and calculate the temporary score according to a number of occurrences of the keyword or operator and a variable complexity factor.

Typically, the algorithm 100 detects the presence of each keyword or operator included in the set of keywords and operators for the particular algorithm 100 and calculates the temporary score if the keyword or operator is present. The general form of the temporary score calculation for each keyword is SCORE=# KEYWORD×CF, where # KEYWORD is the number of occurrences of the keyword and CF is the variable complexity factor. The general form of the temporary score calculation for each operator is SCORE=# OPERATOR×CF, where # OPERATOR is the number of occurrences of the operator and CF is the variable complexity factor. The complexity factor may vary according to the runtime required for implementation of the keyword or operator, the amount of data or memory storage used by the operation that the keyword or operator implements, the amount of change to the database 16 that the keyword or operator performs, etc.

For some keywords, such as "select", "insert", and "update", the complexity of the SQL code is increased by a minimal amount, and thus, the value of the complexity factor is 1, as seen in steps 110, 114, 122. Other keywords, such as "from", "where", "having", "group by", "order by", and the like which form the start of an SQL clause, have a complexity factor value that is greater than 1. The value of the complexity factor may range up to approximately 100, depending on the level of complexity created by these keywords, as seen in steps 146, 150, 198, 206, and others. The value of the complexity factor associated with mathematical and logical operators may vary from 1 to 10, depending on the level of complexity created by the operators, as seen in steps 218, 222, 226, 230, and so on. Other complexity score calculation algorithms may be used that check for the presence of different keywords, or that use different complexity factor values.

After the processing element 22 completes the algorithm 100, the complexity score is calculated. The temporary scores may be summed from all of the calculations steps, such as 106, 110, 114, etc., when the algorithm is complete to produce the complexity score. Alternatively, the complexity score may be accumulated or tabulated from the temporary scores as the algorithm is implemented. If the complexity score is less than or equal to a first threshold, then the processing element 22 may forward the SQL code to execute on the computing system which stores and/or manages the database 16. This is usually an indication that the SQL code will not require a long run time, consume a lot of storage space, and/or require additional computer administration support. If the complexity score is greater than the first threshold, then the processing element 22 may flag the SQL code for the computer administrators or support personnel to review.

In some cases, the SQL code may be allowed to execute anyway after being reviewed. In other cases, the computer administrators may make minor changes to the code to reduce the complexity thereof.

In some embodiments, there may be a second threshold which the processing element 22 checks if the complexity score is greater than the first threshold. The second threshold may be have a value equal to five or ten times the value of the first threshold. If the complexity score is greater than the second threshold, then the processing element 22 may return the SQL code to the original coder to rewrite and reduce the complexity of the SQL code or to rewrite at least a portion of the code in another programming language such as Java, PL1, COBOL, or the like.

An example of determining a score which varies according to a complexity of a set of SQL statements follows. At least a portion of the original SQL code submitted by a coder is shown below:
select tables.table_name, count(*)
from information_schema.tables, information_schema.columns
where upper(tables.table_schema)=upper(columns.table_schema) and
upper(tables.table_name)=upper(columns.table_name)
and tables.table_schema='public'
group by tables.table_name
having count(*)>1;

The code above may alternatively be written as:
select t.table_name, count(*)
from information_schema.tables t, information_schema.columns c
where upper(t.table_schema)=upper(c.table_schema)
and upper(t.table_name)=upper(c.table_name)
and t.table_schema='public'
group by t.table_name
having count(*)>1;

After the original code is parsed, the parsed SQL code may include the following: select, count, from, where, upper, =, upper, and, upper, =, upper, and, =, group by, having, count. (The commas may, or may not, be included in the parsed SQL code.) The parsed SQL code includes all of the keywords and operators of the original code.

The algorithm 100 may be applied to the parsed SQL code with the following results: one "select", score=1; one "group by with having", score=1×50=50; three "=", score=3; four "upper" (scalar functions) in "where" clause, score=4× 50=200; two "count", score=2×10=20. The complexity score is equal to the sum of all of the scores: 1+50+3+200+ 20=274. An exemplary first threshold may have a value of 250. Thus, the processing element 22 may flag the SQL code of the above example for review by computer administrators.

Another example of original SQL code is shown below:
select t.table_name, c.column_name
from information_schema.tables t
    inner join information_schema.columns c
    on t.table_schema=c.table_schema
and t.table_name=c.table_name
where t.table_schema='public';

Yet another example of original SQL code is shown below:
select t.table_name, count(*)
from information_schema.tables t, information_schema.columns c
where upper(t.table_schema)=upper(c.table_schema)
    and upper(t.table_name)=upper(c.table_name)
    and t.table_schema='public'
group by t.table_name
    having count(*)>1;

Exemplary Score Calculations

In one embodiment, the SQL complexity score may be calculated by various rules and/or for each SQL statement. The score may be based upon the type of statement, clause, operand; number and type of predicates; operators (e.g., and, or); sub-clauses or keywords; and/or functions or commands (for instance, the program may look for and identify certain language specific commands, functions, or terms). Below in Table 1 are two example score calculations:

TABLE 1

| Example 1 |
|---|
| SQL Statement |
| select tables.table_name, columns.column_name |
|    from information_schema.tables inner join |
| information_schema.columns |
|      on tables.table_schema = columns.table_schema and |
| tables.table_name = columns.table_name |
|     where tables.table_schema = 'public'; |
| Score Calculation |
| 1 select statement = 1 |
| 1 inner join = 1 * factor of 5 = 5 |
| 1 "=" predicate in the WHERE clause = 1 |
| 1 "AND" in the "ON" clause = 1 |
| Total Complexity Score = 1 + 5 + 1 + 1 = 8 (OK, no issues) |

| Example 2 |
|---|
| SQL Statement |
| select tables.table_name, count (*) |
| from information_schema.tables, information_schema.columns |
| where upper (tables.table_schema) = upper (columns.table_schema) |
| and upper (tables.table_name) = upper (columns.table_name) |
|    and tables.table_schema = 'public' |
|    group |
|      by tables.table_name |
| having count (*) > 1; |
| Score Calculation |
| 1 select statement = 1 |
| 1 inner join = 1 * factor of 5 = 5 |
| 3 "=" predicate in the WHERE clause = 3 |
| 4 scalar functions (UPPER) in as filter in WHERE clause = 4 * factor of 50 = 200 |
| 2 aggregate functions (COUNT(*)) = 2 * factor of 10 = 20 |
| 1 Group By with Having that contains a function = 1 * factor of |

TABLE 1-continued

51 = 51
Total Complexity Score = 1 + 5 + 3 + 200 + 20 + 51 = 280
(border line, mainly because of the scalar functions in the WHERE clause)

Exemplary Computer-Implemented Method

Figure 4:
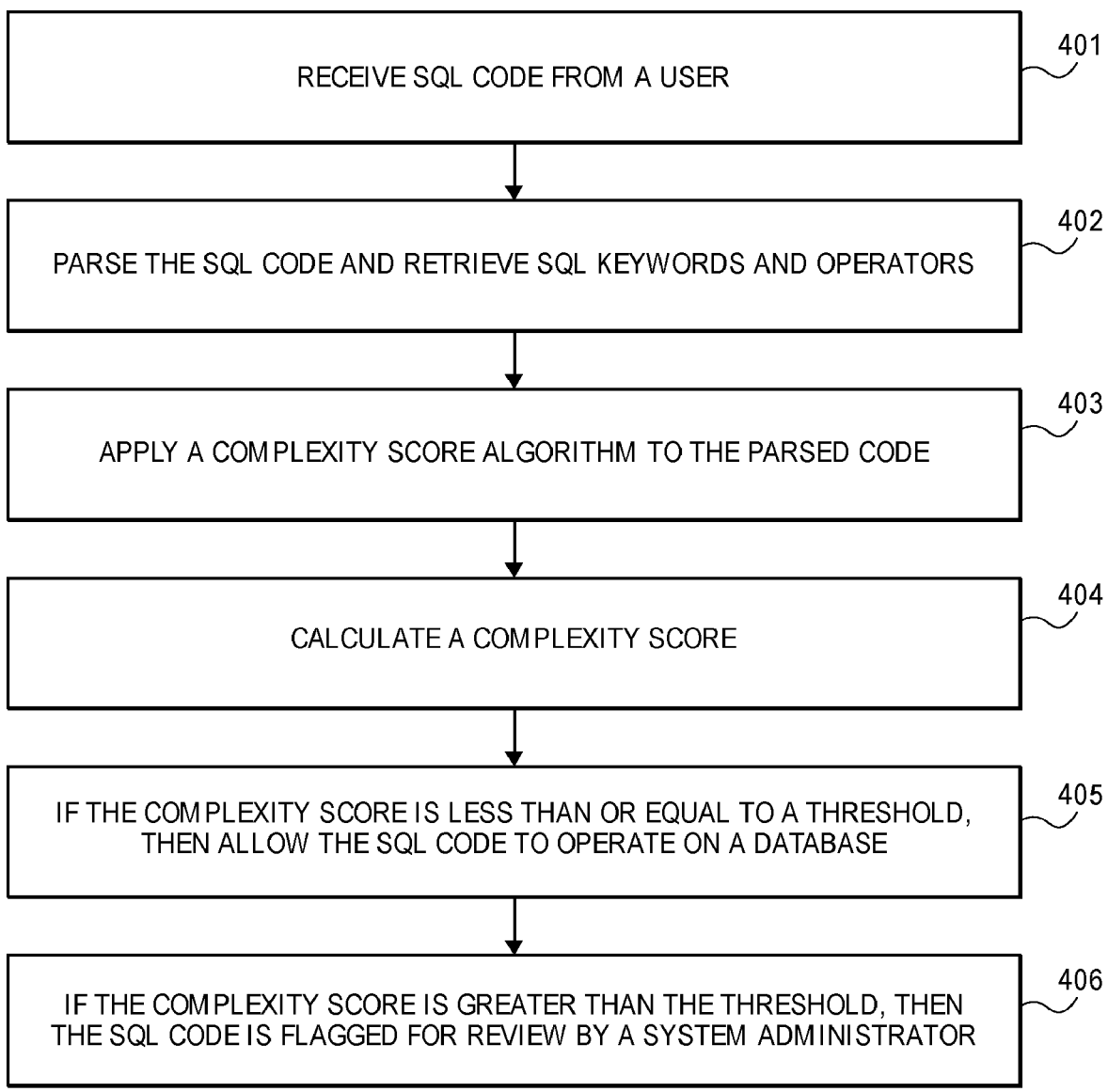
FIG. 4 illustrates at least a portion of the steps of an exemplary computer-implemented method for automatically reviewing structured query language (SQL) statements.

FIG. 4 depicts a listing of steps of an exemplary computer-implemented method 400 for automatically reviewing structured query language (SQL) statements. The steps may be performed in the order shown in FIG. 4, or they may be performed in a different order. Furthermore, some steps may be performed concurrently as opposed to sequentially. In addition, some steps may be optional. The steps of the computer-implemented method 400 may be performed by the computing device 10.

Referring to step 401, SQL code is received from a user. The user may be coder, developer, or programmer who seeks to access and/or operate on a database 16. The user may create the SQL code on an electronic device 12 and transmit the code through a communication network 14 to be received by the computing device 10.

Referring to step 402, the SQL code is parsed and SQL keywords and operators are retrieved. Examples of SQL keywords include, but are not limited to, "select", "insert", "update", and the like. Mathematical operators may include, but are not limited to, "=", "<", ">", and the like. Logical operators may include, but are not limited to, "AND", "OR", "NOT", and the like. The result of this step is parsed SQL code, which may include a list, table, or array of the keywords and operators which were include in the originally submitted SQL code.

Referring to step 403, a complexity score calculation algorithm is applied to the parsed SQL code. An exemplary complexity score calculation algorithm 100 is shown in FIGS. 3A-3D. The algorithm 100 may begin with receiving the parsed SQL code in step 102. The algorithm 100 may then check in step 104 if the parsed SQL code was derived from SQL code that was written using older, pre ANSI SQL-92 standard statements.

The processing element 22 may detect metadata or header statements in the parsed SQL code which identify the version of SQL that was used to create the code. Or, the processing element 22 may detect the lack of newer SQL statement syntax and conclude that the code is pre SQL-92. If pre SQL-92 is detected, then a temporary score is set to a value of 10 in step 106. The rest of the steps 108-298 of the algorithm 100 may determine the presence of keywords and operators in the parsed SQL code and calculate the temporary score according to a number of occurrences of the keyword or operator and a variable complexity factor. Typically, the algorithm 100 detects the presence of each keyword or operator included in the set of keywords and operators for the particular algorithm 100 and calculates the temporary score if the keyword or operator is present.

The general form of the temporary score calculation for each keyword is SCORE=# KEYWORD×CF, where # KEYWORD is the number of occurrences of the keyword and CF is the variable complexity factor. The general form of the temporary score calculation for each operator is SCORE=# OPERATOR×CF, where # OPERATOR is the number of occurrences of the operator and CF is the variable complexity factor.

The complexity factor may vary according to the runtime required for implementation of the keyword or operator, the amount of data or memory storage used by the operation that the keyword or operator implements, the amount of change to the database 16 that the keyword or operator performs, etc. For some keywords, such as "select", "insert", and "update", the complexity of the SQL code is increased by a minimal amount, and thus, the value of the complexity factor is 1, as seen in steps 110, 114, 122. Other keywords, such as "from", "where", "having", "group by", "order by", and the like which form the start of an SQL clause, have a complexity factor value that is greater than 1.

The value of the complexity factor may range up to approximately 100, depending on the level of complexity created by these keywords, as seen in steps 146, 150, 198, 206, and others. The value of the complexity factor associated with mathematical and logical operators may vary from 1 to 10, depending on the level of complexity created by the operators, as seen in steps 218, 222, 226, 230, and so on. Other complexity score calculation algorithms may be used that check for the presence of different keywords, or that use different complexity factor values.

Referring to step 404, the complexity score is calculated. The temporary scores may be summed from all of the calculations steps, such as 106, 110, 114, etc., when the algorithm is complete to produce the complexity score. Alternatively, the complexity score may be accumulated or tabulated from the temporary scores as the algorithm is implemented.

Referring to step 405, the SQL code is allowed to execute on the computing system which stores and/or manages the database 16 if the complexity score is less than or equal to a first threshold. This is usually an indication that the SQL code will not require a long run time, consume a lot of storage space, or require additional computer administration support.

Referring to step 406, the SQL code may be flagged for the computer administrators or support personnel to review if the complexity score is greater than the first threshold. In some cases, the SQL code may be allowed to execute anyway after being reviewed. In other cases, the computer administrators may make minor changes to the code to reduce the complexity thereof. In some embodiments, there may be a second threshold which the processing element 22 checks if the complexity score is greater than the first threshold. The second threshold may be have a value equal to five or ten times the value of the first threshold. If the complexity score is greater than the second threshold, then the processing element 22 may return the SQL code to the original coder to rewrite and reduce the complexity of the SQL code, or to rewrite at least a portion of the code in another programming language such as Java, PL1, COBOL, or the like.

Exemplary Computer-Implemented Method for Automatically Reviewing Structured Query Language (SQL) Statements In a first aspect, a computer-implemented method for automatically reviewing structured query language (SQL) statements may be provided. The method may include: (1) receiving SQL code from a user seeking to access a database; (2) parsing the SQL code to retrieve SQL keywords, mathematical operators, and logical operators; (3) applying a complexity score calculation algorithm to the parsed code; (4) calculating a complexity score; and/or (5) executing the SQL code on a computing system which stores the database if or when the complexity score is less than or equal to a first threshold. The method may include additional, fewer, or alternative actions, including those discussed elsewhere herein.

For instance, the method may include: flagging the SQL code to be reviewed by a computer administrator if the complexity score is greater than the first threshold. In addition, the complexity score calculation algorithm may determine the presence of keywords, mathematical operators, and logical operators in the parsed SQL code and calculates a temporary score for each keyword, mathematical operator, and logical operator; the complexity score may be the sum of the temporary scores; the temporary score for each keyword may be equal to a product of a number of occurrences of the keyword and a variable complexity factor, the complexity factor may have a value greater than 1 for keywords that form the start of an SQL clause; the temporary score for each mathematical operator may be equal to a product of a number of occurrences of the mathematical operator and a variable complexity factor; and the temporary score for each logical operator may be equal to a product of a number of occurrences of the logical operator and a variable complexity factor.

Exemplary Computer-Readable Medium for Automatically Reviewing Structured Query Language (SQL) Statements In another aspect, a computer-readable medium for automatically reviewing structured query language (SQL) statements may be provided. The computer-readable medium may include an executable program stored thereon, wherein the program instructs a processing element of a computing device to perform the following steps: (1) receiving SQL code from a user seeking to access a database; (2) parsing the SQL code to retrieve SQL keywords, mathematical operators, and logical operators; (3) applying a complexity score calculation algorithm to the parsed code; (4) calculating a complexity score; and/or (5) executing the SQL code on a computing system which stores the database if the complexity score is less than or equal to a first threshold. The program stored on the computer-readable medium may instruct the processing element to perform additional, fewer, or alternative actions, including those discussed elsewhere herein.

For instance, the program may instruct the processing element to: flag the SQL code to be reviewed by a computer administrator if the complexity score is greater than the first threshold. In addition, the complexity score calculation algorithm determines the presence of keywords, mathematical operators, and logical operators in the parsed SQL code and calculates a temporary score for each keyword, mathematical operator, and logical operator, the complexity score is the sum of the temporary scores; the temporary score for each keyword is equal to a product of a number of occurrences of the keyword and a variable complexity factor the complexity factor has a value greater than 1 for keywords that form the start of an SQL clause; the temporary score for each mathematical operator is equal to a product of a number of occurrences of the mathematical operator and a variable complexity factor, and the temporary score for each logical operator is equal to a product of a number of occurrences of the logical operator and a variable complexity factor.

Exemplary Computing Device for Automatically Reviewing Structured Query Language (SQL) Statements In yet another aspect, a computing device for automatically reviewing structured query language (SQL) statements may be provided. The computing device may include a communication element, a memory element, and a processing element. The communication element may receive and transmit communications to and from a communication network. The memory element may be electronically coupled to the communication element and may store executable instructions. The processing element may be electronically coupled to the communication element and the memory element. The processing element may be configured to receive SQL code from a user seeking to access a database; parse the SQL code to retrieve SQL keywords, mathematical operators, and logical operators; apply a complexity score calculation algorithm to the parsed code; calculate a complexity score; and/or execute the SQL code on a computing system which stores the database if the complexity score is less than or equal to a first threshold. The computing device may include additional, fewer, or alternate components and/or functionality, including that discussed elsewhere herein.

For instance, the processing element may be further configured to: flag the SQL code to be reviewed by a computer administrator if the complexity score is greater than the first threshold. In addition, the complexity score calculation algorithm determines the presence of keywords, mathematical operators, and logical operators in the parsed SQL code and calculates a temporary score for each keyword, mathematical operator, and logical operator; the complexity score is the sum of the temporary scores; the temporary score for each keyword is equal to a product of a number of occurrences of the keyword and a variable complexity factor, the complexity factor has a value greater than 1 for keywords that form the start of an SQL clause; the temporary score for each mathematical operator is equal to a product of a number of occurrences of the mathematical operator and a variable complexity factor, and the temporary score for each logical operator is equal to a product of a number of occurrences of the logical operator and a variable complexity factor.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for automatically reviewing structured query language (SQL) statements, the computer-implemented method comprising, via one or more processors:

parsing SQL code to retrieve SQL keywords, mathematical operators, and logical operators;
identifying the version of SQL that was used to create the SQL code;
detecting pre-SQL-92 code based on a lack of newer SQL statement syntax;
setting a temporary score if pre-SQL-92 code is detected;
applying a complexity score calculation algorithm to the parsed SQL code to determine a presence of keywords and operators in the parsed SQL code;
calculating a complexity score that varies according to a number of occurrences of keywords or operators and a variable complexity factor;
executing the SQL code on a computing system which stores the database if the complexity score is less than or equal to a first threshold; and
flagging the SQL code to be reviewed by a computer administrator if the complexity score is greater than the first threshold.

2. The computer-implemented method of claim 1, the method further comprising:
returning the SQL code to an original coder to rewrite at least a portion of the SQL code in a different programming language if the complexity score is greater than a second threshold.

3. The computer-implemented method of claim 1, wherein the complexity score calculation algorithm calculates a temporary score for the retrieved keywords, mathematical operators, and logical operators.

4. The computer-implemented method of claim 3, wherein the complexity score is the sum of the temporary scores.

5. The computer-implemented method of claim 3, wherein the temporary score for each keyword is equal to a product of a number of occurrences of the keyword and a variable complexity factor.

6. The computer-implemented method of claim 5, wherein the complexity factor has a value greater than 1 for keywords that form the start of an SQL clause.

7. The computer-implemented method of claim 3, wherein the temporary score for each mathematical operator is equal to a product of a number of occurrences of the mathematical operator and a variable complexity factor or a product of a number of occurrences of the logical operator and a variable complexity factor.

8. A non-transitory computer-readable medium with an executable program stored thereon for automatically reviewing structured query language (SQL) statements, wherein the program instructs a processing element of a computing device to perform the following:
parsing SQL code to retrieve SQL keywords, mathematical operators, and logical operators;
identifying the version of SQL that was used to create the SQL code;
detecting pre-SQL-92 code based on a lack of newer SQL statement syntax;
setting a temporary score if pre-SQL-92 code is detected;
applying a complexity score calculation algorithm to the parsed SQL code to determine a presence of keywords and operators in the parsed SQL code;
calculating a complexity score that varies according to a number of occurrences of keywords or operators and a variable complexity factor;
executing the SQL code on a computing system which stores the database if the complexity score is less than or equal to a first threshold; and
flagging the SQL code to be reviewed by a computer administrator if the complexity score is greater than the first threshold.

9. The non-transitory computer-readable medium of claim 8, wherein the program instructs the processing element of the computing device to further perform the following:
returning the SQL code to an original coder to rewrite at least a portion of the SQL code in a different programming language if the complexity score is greater than a second threshold.

10. The non-transitory computer-readable medium of claim 8, wherein the complexity score calculation algorithm calculates a temporary score for the retrieved keywords, mathematical operators, and logical operators.

11. The non-transitory computer-readable medium of claim 10, wherein the complexity score is the sum of the temporary scores.

12. The non-transitory computer-readable medium of claim 10, wherein the temporary score for each keyword is equal to a product of a number of occurrences of the keyword and a variable complexity factor which has a value greater than 1 for keywords that form the start of an SQL clause.

13. The non-transitory computer-readable medium of claim 10, wherein the temporary score for each mathematical operator is equal to a product of a number of occurrences of the mathematical operator and a variable complexity factor or a product of a number of occurrences of the logical operator and a variable complexity factor.

14. A computing device for automatically reviewing structured query language (SQL) statements, the device comprising:
a communication element configured to receive and transmit communications to and from a communication network;
a memory element electronically coupled to the communication element, the memory element configured to store executable instructions; and
a processing element electronically coupled to the communication element and the memory element, the processing element configured to—
parse SQL code to retrieve SQL keywords, mathematical operators, and logical operators;
identify the version of SQL that was used to create the SQL code;
detect pre-SQL-92 code based on a lack of newer SQL statement syntax;
set a temporary score if pre-SQL-92 code is detected;
apply a complexity score calculation algorithm to the parsed SQL code to determine a presence of keywords and operators in the parsed SQL code;
calculate a complexity score that varies according to a number of occurrences of keywords or operators and a variable complexity factor;
execute the SQL code on a computing system which stores the database if the complexity score is less than or equal to a first threshold; and
flag the SQL code to be reviewed by a computer administrator if the complexity score is greater than the first threshold.

15. The computing device of claim 14, wherein the processing element is further configured to return the SQL code to an original coder to rewrite at least a portion of the SQL code in a different programming language if the complexity score is greater than the first threshold.

16. The computing device of claim 14, wherein the complexity score calculation algorithm calculates a temporary score for the retrieved keywords, mathematical operators, and logical operators.

17. The computing device of claim 16, wherein the complexity score is the sum of the temporary scores.

18. The computing device of claim 16, wherein the temporary score for each keyword is equal to a product of a number of occurrences of the keyword and a variable complexity factor.

19. The computing device of claim 18, wherein the complexity factor has a value greater than 1 for keywords that form the start of an SQL clause.

20. The computing device of claim 16, wherein the temporary score for each mathematical operator is equal to a product of a number of occurrences of the mathematical operator and a variable complexity factor or a product of a number of occurrences of the logical operator and a variable complexity factor.

* * * * *